United States Patent [19]

Rekawek

[11] 3,927,770

[45] Dec. 23, 1975

[54] APPARATUS TO FACILITATE JOINING PIPE SECTIONS TOGETHER TO FORM A VERTICAL PIPE COLUMN

[75] Inventor: Janusz J. Rekawek, Clarkston, Mich.

[73] Assignee: Darel Bennett, Royal Oak, Mich.

[22] Filed: Apr. 22, 1974

[21] Appl. No.: 462,843

[52] U.S. Cl. ................... 214/1 P; 29/200 P; 52/123; 228/6; 228/48; 228/49; 228/212; 269/45
[51] Int. Cl.² ........................................ B23K 37/04
[58] Field of Search ............ 269/45, 46; 228/48, 49, 228/6, 212; 29/493, 200 P; 52/123; 214/1 P, DIG. 3; 254/139, 173 R, 183

[56] References Cited
UNITED STATES PATENTS

| | | | |
|---|---|---|---|
| 1,605,472 | 11/1926 | Schick | 52/123 |
| 1,906,362 | 5/1933 | Brown | 214/DIG. 3 |
| 2,463,907 | 3/1949 | Risley et al. | 228/48 |
| 3,494,593 | 2/1970 | Blagg | 254/139 |
| 3,497,787 | 2/1970 | Fuelster et al. | 254/173 R |
| 3,657,786 | 4/1972 | Wiswell, Jr. | 29/200 P |

Primary Examiner—Carl E. Hall
Attorney, Agent, or Firm—Reising, Ethington, Barnard, Perry and Brooks

[57] ABSTRACT

A cable, extending from a winch and passing over a pulley, is attached to a pipe section supported at its lower end by a rotatable conical support member. The rotatable conical support member is rotated by a motor drive. A second cable, extending from a second winch and passing over a second pulley, is connected to an expanse of pipe, comprising one or more pipe sections, suspended vertically above the pipe section. The expanse of pipe and the pipe section are aligned so that the bottom of the expanse of pipe abuts the top of the pipe section. A welder-operator welds the pipe section to the expanse of pipe at the abutment, actuating the motor drive to rotate the conical support member and the pipe section to expose the entire circumference of the abutment. After the weld is complete, the winch coupled to the expanse of pipe is activated to raise the expanse of pipe. The next pipe section to be added to the expanse of pipe is then attached to the other cable. That pipe section is then placed on the conical support member, and the process is repeated.

8 Claims, 3 Drawing Figures

APPARATUS TO FACILITATE JOINING PIPE SECTIONS TOGETHER TO FORM A VERTICAL PIPE COLUMN

FIELD OF THE INVENTION

This invention relates to a method and apparatus to facilitate joining pipe sections together to form a vertical pipe column.

DESCRIPTION OF THE PRIOR ART

It is commonplace to provide a shaft in a building to house a cluster of pipe columns extending from the ground level of the building to the top of the building. These pipe columns are fabricated by joining several pipe sections together. Typically, these pipe columns are assembled from the ground up. For example, a welder may progress up through the floors of the building welding additional pipe sections to the tops of the growing pipe columns. Using this method, equipment and pipe sections must be transported from floor to floor as the pipe columns increase in height. In view of the need to move equipment and supplies, it should be readily appreciated that this conventional approach to the fabrication of pipe columns is a slow and cumbersome process.

The known prior art pertinent to the fabrication of pipe columns offers no guidance as to possible improvements in this slow and cumbersome process. Patents directed to the assembly of well casings are illustrative of the prior art—for example, U.S. Pat. Nos. Baker 2,956,147 and Thornburg 2,972,388. Each of these patents discloses an approach to fabricating pipe columns similar to that described above: Pipe sections are consecutively added to the top of a growing vertical pipe column.

Prior art welding mechanisms are no more helpful than the casing patents noted. Representative welding mechanisms are disclosed in two patents to Patterson U.S. Pat. No. 2,440,696 and 2,440,697. Nor is any valuable insight available from the general construction arts. Methods and apparatus for assembling storage enclosures are described in the U.S. Pat. Nos. to Raymond 1,872,810 and Talcott 2,708,012. The Raymond patent discloses an assembly approach involving the addition of sections to the top of a growing metal assembly. Talcott discloses the construction of additional sections beneath completed sections, but it provides nothing of value in respect of the problems confronted in the assembly of pipe columns in buildings.

SUMMARY OF THE INVENTION

The present invention provides a method and apparatus which facilitates the fabrication of vertical pipe columns in buildings. This method and apparatus yields impressive advantages by comparison with the conventional methods and apparatus previously used. Particularly, the present invention produces savings in time, and the present invention greatly simplifies the fabrication process by permitting that process to be carried out from a single position. The instant method and apparatus present advancements altogether unknown in the prior art.

A cable, extending from a winch and passing over a pulley, is attached to a pipe section supported at its lower end by a rotatable conical support member. The rotatable conical support member is rotated by a motor drive. A second cable, extending from a second winch and passing over a second pulley, is connected to an expanse of pipe, comprising one or more pipe sections, suspended vertically above the pipe section. The expanse of pipe and the pipe section are aligned so that the bottom of the expanse of 2 pipe abuts the top of the pipe section. A welder-operator welds the pipe section to the expanse of pipe at the abutment, actuating the motor drive to rotate the conical support member and the pipe section to expose the entire circumference of the abutment. After the weld is complete, the winch coupled to the expanse of pipe is activated to raise the expanse of pipe. The next pipe section to be added to the expanse of pipe is then attached to the other cable. That pipe section is then placed on the conical support member, and the process is repeated.

BRIEF DESCRIPTION OF THE DRAWINGS

The instant invention can be best understood by reference to the following description of a preferred embodiment taken in connection with the accompanying drawings, in which.

DESCRIPITION OF THE PREFERRED EMBODIMENT

Figure 1:
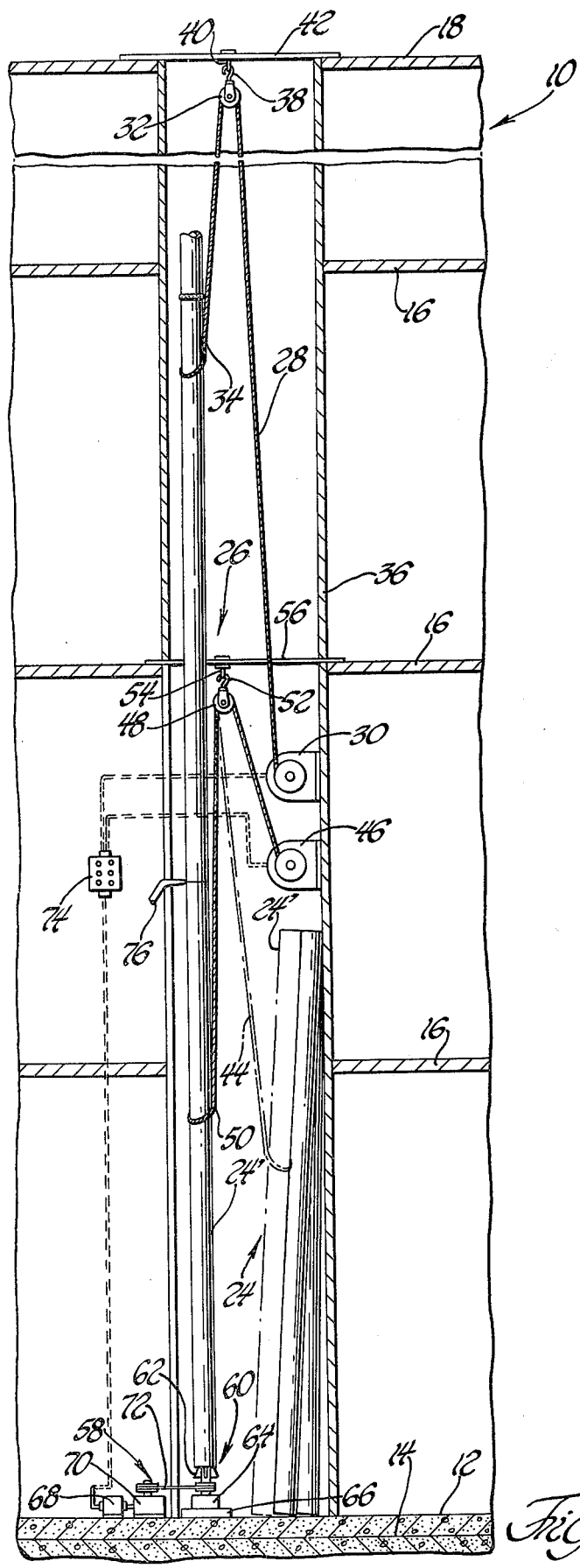
FIG. 1 is a partial sectional view of a building including a shaft in which a pipe column is being fabricated using the apparatus and method of the present invention.
Figure 2:
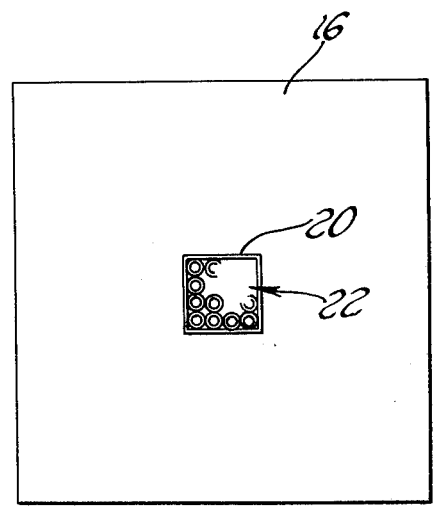
FIG. 2 is a plan view of a floor of the building illustrated in FIG. 1 showing the shaft and the pipe cluster disposed therein.

Reference should now be made to the drawings and more particularly to FIG. 1 wherein the apparatus of the present invention is illustrated as it is used in a building generally designated 10. The ground floor 12 of the building 10 rests directly on the earth 14. The building 10 includes several floors 16 between the ground floor 12 and the roof 18. As best illustrated in FIG. 2, the building 10 also includes a shaft 20 which houses a cluster of vertical pipe columns generally designated 22.

Each of the pipe columns 22 is made up of several pipe sections from the available supply of pipe sections, generally designated 24, within the shaft 20. Using the instant method and apparatus to fabricate a pipe column 22, respective pipe sections 24 are consecutively appended to a suspended expanse of pipe, illustrated in FIG. 1 as a suspended expanse of pipe 26. A cable 28, extending from a winch 30 and passing over a pulley 32, is attached by a harness or collar 34 to the expanse of pipe 26 to suspend the expanse of pipe 26 at a controllable elevation above the ground floor 12. The expanse of pipe 26 is a single pipe section when the fabrication of a given pipe column 22 is first commenced, and it increases in length each time an additional pipe section is joined to the lower end of the expanse 26.

The winch 30 is secured to a side wall 36 of the shaft 20, for example by means of mounting screws or bolts. It is understood and appreciated that the winch 30 could be rigidly positioned by diverse other means within the skill of the art. The pulley 32 includes a hook 38 which connects to a hook 40 carried by a support plate 42. The support plate 42 spans the shaft 20, and is supported by the roof 18 in the preferred embodiment. It is understood and appreciated that the support plate 42 could be replaced by diverse other devices within the skill of the art, that the support plate 42 itself can take a variety of forms, and that it can be supportd at a floor 16 rather than at the roof 18.

A second cable 44, extending from a second winch 46 and passing over a second pulley 48, is attached by a harness or collar 50 to the particular pipe section 24' which is to be joined to the expanse of pipe 26. The winch 46, like the winch 30, is secured to the side wall 36. Of course, it too could be positioned by other means. The pulley 48 includes a hook 52 which connects to a hook 54 connected to a support plate 56, which is similar to the support described for the pulley 32. The support plate spans the shaft 20, and it is supported by a floor 16 in the preferred embodiment. As for the support plate 42, numerous alternatives to the support plate 56 as described are available within the skill of the art.

Figure 3:
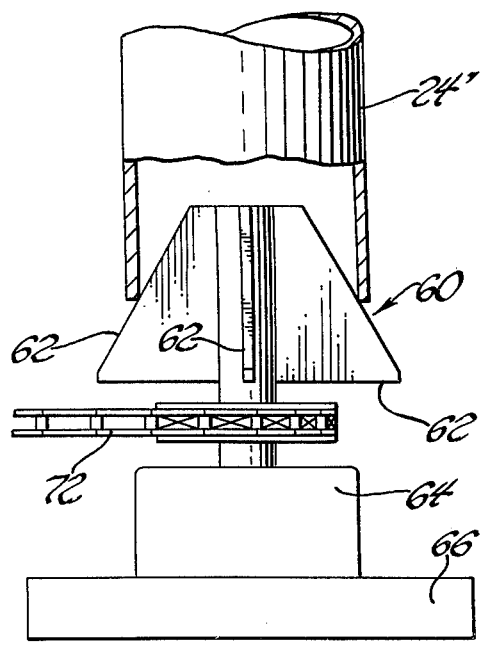
FIG. 3 is a partial sectional view of the motor driven rotatable conical support member used in the present invention.

The pipe section 24' is supported at its lower end by a rotatable support member generally designated 58 placed on the ground floor 12. As best illustrated in FIG. 3, the rotatable support member 58 comprises a conical support member generally designated 60 comprising four truncated triangular plates 62, a bearing 64, and a base 66. As shown in FIG. 1, a motor 68, coupled to a drive mechanism 70, drives the conical support member 60 in a conventional manner through a chain or belt 72. It is understood and apppreciated that alternative drive arrangements could be substituted for the motor 68, the drive mechanism 70, and the chain or belt 72.

The conical support member 60, which is inserted into the bottom of the pipe section 24', is effective to align the pipe section 24' for welding to the expanse of pipe 26. The triangular plates 62 permit use of a single support member 60 with a wide range of pipe diameters.

The winches 30 and 46, and the motor 68, are controlled from a control panel 74 which is located convenient to the operator.

When a pipe section 24 is to be added to the expanse of pipe 26, the collar 50 is attached to that pipe section. The following example is directed to the pipe section 24'.

The attachment of the collar 50 to the pipe section 24' is illustrated by a phantom line representation of the pipe section 24', the cable 44, and the collar 50, as well as by the solid line representation of the pipe section 24', the cable 44, and the collar 50. After the collar 50 is attached to the pipe section 24' as shown in phantom, the winch 46 is activated to lift the pipe section 24' from the ground floor 12. The pipe section 24' is then swung to the position where it rests on the support member 60 as shown.

Before the pipe section 24' is swung to the position illustrated in solid line, the expanse of pipe 26 is vertically raised by activating the winch 30. The expanse of pipe 26 is raised to a level so that its lower end is above the position of the upper end shown for the pipe section 24'. After the pipe section 24' is positioned as shown, the expanse of pipe 26 is lowered into abutting contact with the pipe section 24'.

The pipe section 24' is joined, in the preferred embodiment, to the expanse of pipe 26 by welding, such as by means of a torch 76. It is understood and appreciated that various alternative joining methods are possible within the skill of the art. During the welding operation, the control panel 74 is caused to energize the motor 68 to rotate the conical support member 60. As the conical support member 60 rotates, the pipe section 24' and the expanse of pipe 26 also rotate to permit the weld to be made entirely around the circumference of the pipe. After the weld is complete, the winch 30 is activted to lift the expanse of pipe 26, with the pipe member 24' welded thereto, above the vertical height of a single pipe section 24. The collar 50 is then removed from the bottom of this extended expanse of pipe 26 and attached to the next pipe section 24 to be added. The entire process is repeated as many times as required to produce a pipe column 22 of the desired height.

Although the foregoing has proceeded in terms of a particular preferred embodiment, it is understood and appreciated that various changes and modifications could be engrafted thereon by one skilled in the art within the spirit and scope of the appended claims.

The embodiments of the invention in which an exclusive property or privilege is claimed are defined as follows:

1. A pipe handling apparatus comprising:
   means for supporting a first pipe section in a substantially vertical orientation;
   means for suspending a second pipe section at a vertical height above the first pipe section, the second pipe section being suspended in a substantially vertical orientation;
   means for controlling the relative positions of the first pipe section and the second pipe section such that the pipe sections are abutted end to end while in the vertical orientation and can be joined together; and
   means for rotating the first pipe section and the second pipe section about a substantially vertical axis while the second pipe section is abutted to the first pipe section.

2. A pipe handling apparatus as in claim 1, wherein said means for rotating includes a rotatable conical support member.

3. A pipe handling apparatus as in claim 1, wherein said means for suspending the second pipe section includes a winch and a cable.

4. A pipe handling apparatus as in claim 3, wherein said means for suspending the second pipe section includes a pulley and a collar adapted to secure said cable to the second pipe section.

5. A pipe handling apparatus as in claim 4, wherein said means for supporting the first pipe section includes means for suspending that pipe section.

6. A pipe handling apparatus as in claim 5, wherein said means for suspending the first pipe section includes a winch, a cable, a pulley, and a collar suitable for attaching the cable to the first pipe section.

7. A pipe handling apparatus as in claim 6, including a conical support member adapted to support the first pipe section and to align the first pipe section with the second pipe section.

8. A pipe handling apparatus as in claim 7, wherein said pipe sections are joined by welding, and wherein said first named winch, said second named winch, and said conical support member are power operated and are adapted to be controlled at a control panel adapted to be located proximate to the position of the apparatus operator.

* * * * *